United States Patent
Choi

(10) Patent No.: US 7,697,161 B2
(45) Date of Patent: Apr. 13, 2010

(54) METHOD OF DISPLAYING WALLPAPER AND APPARATUS FOR DISPLAYING WALLPAPER

(75) Inventor: Sung-hwan Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 900 days.

(21) Appl. No.: 11/491,230

(22) Filed: Jul. 24, 2006

(65) Prior Publication Data
US 2007/0024916 A1 Feb. 1, 2007

(30) Foreign Application Priority Data
Jul. 27, 2005 (KR) .................. 10-2005-0068464

(51) Int. Cl.
*G06F 15/00* (2006.01)
(52) U.S. Cl. .................. 358/1.2; 358/1.18; 358/451
(58) Field of Classification Search ........... 358/451, 358/1.2, 1.1, 1.9, 1.13, 1.18, 453, 3.29; 382/298
See application file for complete search history.

(56) References Cited

U.S. PATENT DOCUMENTS

| 5,739,867 A * | 4/1998 | Eglit ........................ 348/581 |
| 6,456,305 B1 * | 9/2002 | Qureshi et al. ............ 715/800 |
| 2003/0174346 A1 | 9/2003 | Nagatani |
| 2004/0080518 A1 | 4/2004 | Lee |
| 2004/0088656 A1 * | 5/2004 | Washio ...................... 715/526 |

FOREIGN PATENT DOCUMENTS

| CN | 1492594 | 4/2004 |
| CN | 1149468 | 5/2004 |
| EP | 0 996 053 | 10/1999 |
| JP | 3-259673 | 11/1991 |
| JP | 2003-274155 | 9/2003 |
| JP | 2004-271802 | 9/2004 |
| JP | 2004-362222 | 12/2004 |

(Continued)

OTHER PUBLICATIONS

Chinese Office Action dated Oct. 19, 2007 for Chinese Patent Application No. 200610108123.2 (with English translation).

(Continued)

*Primary Examiner*—Thomas D Lee
(74) *Attorney, Agent, or Firm*—Jefferson IP Law, LLP

(57) ABSTRACT

A method of displaying wallpaper and an apparatus for displaying wallpaper includes displaying an input image to be displayed on wallpaper as a background image and a wallpaper displaying frame containing the entire image or a part of the input image on a wallpaper setting window, modifying a wallpaper displaying frame area according to a user's instruction, and displaying the modified frame area on the wallpaper. The apparatus for displaying wallpaper includes an application unit that displays an input image to be inputted as a background image for wallpaper and a wallpaper displaying frame containing the entire input image or a part of the input image on a wallpaper setting window, a modification unit that modifies a wallpaper displaying frame area specified by the application unit according to a user's instruction, and a wallpaper displaying unit that displays the frame area modified by the modification unit on the wallpaper.

25 Claims, 16 Drawing Sheets

FOREIGN PATENT DOCUMENTS

| | | |
|---|---|---|
| KR | 1999-17791 | 3/1999 |
| KR | 2002-5364 | 1/2002 |
| KR | 2004-9010 | 1/2004 |
| KR | 2004-98133 | 11/2004 |
| KR | 2005-74034 A | 7/2005 |

OTHER PUBLICATIONS

Notice of Allowance issued Jun. 26, 2007 by the Korean Intellectual Property Office re: Korean Patent Application No. 2005-68464 (4 pp).

Office Action issued in Korea Patent Application No. 2005-68464 on Oct. 13, 2006.

* cited by examiner

METHOD OF DISPLAYING WALLPAPER AND APPARATUS FOR DISPLAYING WALLPAPER

CROSS-REFERENCE TO RELATED APPLICATION

This application claims the benefit of Korean Application No. 2005-68464, filed Jul. 27, 2005 in the Korean Intellectual Property Office, the disclosure of which is incorporated herein by reference.

BACKGROUND OF THE INVENTION

1. Field of the Invention

Aspects of the present invention relate to a method of displaying wallpaper and an apparatus for displaying wallpaper, and more particularly, to a method of displaying wallpaper and an apparatus for displaying an image that a user wants as a wallpaper by regulating the size and location of the image and the ratio of width to height of the image.

2. Description of the Related Art

Generally, methods for displaying a wallpaper are exemplified by a "center setting," a "checkerboard setting," or a "stretch setting," and depending on the degree of resolution of an image and a wallpaper, two different cases should be considered. In the first case, an image for the wallpaper is larger than a wallpaper area, and in the other an image for the wallpaper is smaller than the wallpaper area.

FIGS. 1A, 1B, and 1C are diagrams illustrating the cases in which an input image is smaller than a wallpaper in a method of displaying a wallpaper according to the conventional art. FIG. 1A is a diagram illustrating the display of the image by center setting, FIG. 1B is a diagram illustrating the display of the image by stretch setting, and FIG. 1C is a diagram illustrating the display of the image by checkerboard setting. According to the center setting, the image is displayed exactly in the center of a wallpaper area while keeping the resolution of the original image, as illustrated in FIG. 1A. According to the stretch setting, the image is displayed after it is enlarged to fit the resolution of the whole wallpaper area regardless of the size and the ratio of width to height of the original image, as illustrated in FIG. 1B. According to the checkerboard setting, the same image is repeated in a checkerboard pattern while keeping the resolution of the original image, as illustrated in FIG. 1C.

FIGS. 2A, 2B, and 2C are diagrams illustrating the cases in which the input image is larger than the wallpaper area in a method of displaying wallpaper according to the conventional art. FIG. 2A is a diagram illustrating the display of the image by center setting, FIG. 2B is a diagram illustrating the display of the image by stretch setting, and FIG. 2C is a diagram illustrating the display of the image by checkerboard setting. According to the center setting, only the center part of the image is displayed on the wallpaper area while keeping the resolution of the original image, as illustrated in FIG. 2A. According to the stretch setting, the image displayed after it is reduced to fit the resolution of the wallpaper area regardless of the size and the ratio of width to height of the original image, as illustrated in FIG. 2B. According to the checkerboard setting, a left upper part of the image is displayed on the wallpaper area while keeping the resolution of the original image, as illustrated in FIG. 2C.

However, the conventional art for displaying a wallpaper has the problem that the image becomes distorted from the difference in the width to height ratios between the image and an apparatus for displaying the wallpaper. In FIGS. 1A and 1C, the images are displayed in the center of the wallpaper area without distortion. However, in FIG. 1B, the image is enlarged to fit the resolution of the wallpaper, resulting in distortion of the image.

In FIG. 2A, although the image is not distorted, a large part of the image is cut out and not displayed, and in FIG. 2B, the image can be seen but is compressed. In FIG. 2C, only an upper left part of the image is displayed.

Accordingly, the conventional art has a problem in that only part of an image selected by a user is displayed or the selected image is distorted.

SUMMARY OF THE INVENTION

Aspects of the present invention includes a method of displaying a wallpaper and an apparatus for displaying the wallpaper in which the size, location and ratio of width to height of an input image are coordinated in accordance with a user's instruction, regardless of the resolution of the image.

Additional aspects and/or advantages of the invention will be set forth in part in the description which follows and, in part, will be obvious from the description, or may be learned by practice of the invention.

The present invention will not be limited to the technical objects described above. Other objects not described herein will be more definitely understood by those in the art from the following detailed description.

According to an aspect of the present invention, there is a method of displaying wallpaper, the method including displaying an input image as a background image and a wallpaper displaying frame area containing the entire image and/or a part of the input image on an area of a wallpaper setting window; modifying the wallpaper displaying frame area according to a user's instruction; and displaying the modified wallpaper displaying frame area on the wallpaper setting window.

According to another aspect of the invention, there is an apparatus for displaying wallpaper, the apparatus including an application unit that displays an input image to be inputted as a background image for a wallpaper area and a wallpaper displaying frame area containing the entire image and/or a part of the input image on a wallpaper setting window; a modification unit that modifies the wallpaper displaying frame area specified by the application unit according to a user's instruction; and a wallpaper displaying unit that displays the wallpaper displaying frame area modified by the modification unit in the wallpaper area.

According to another aspect of the invention, there is a method of displaying a wallpaper on a wallpaper area of a display, including displaying an image on a window, displaying a frame area representing the wallpaper area over the image, and modifying the frame area according to a user's instruction.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
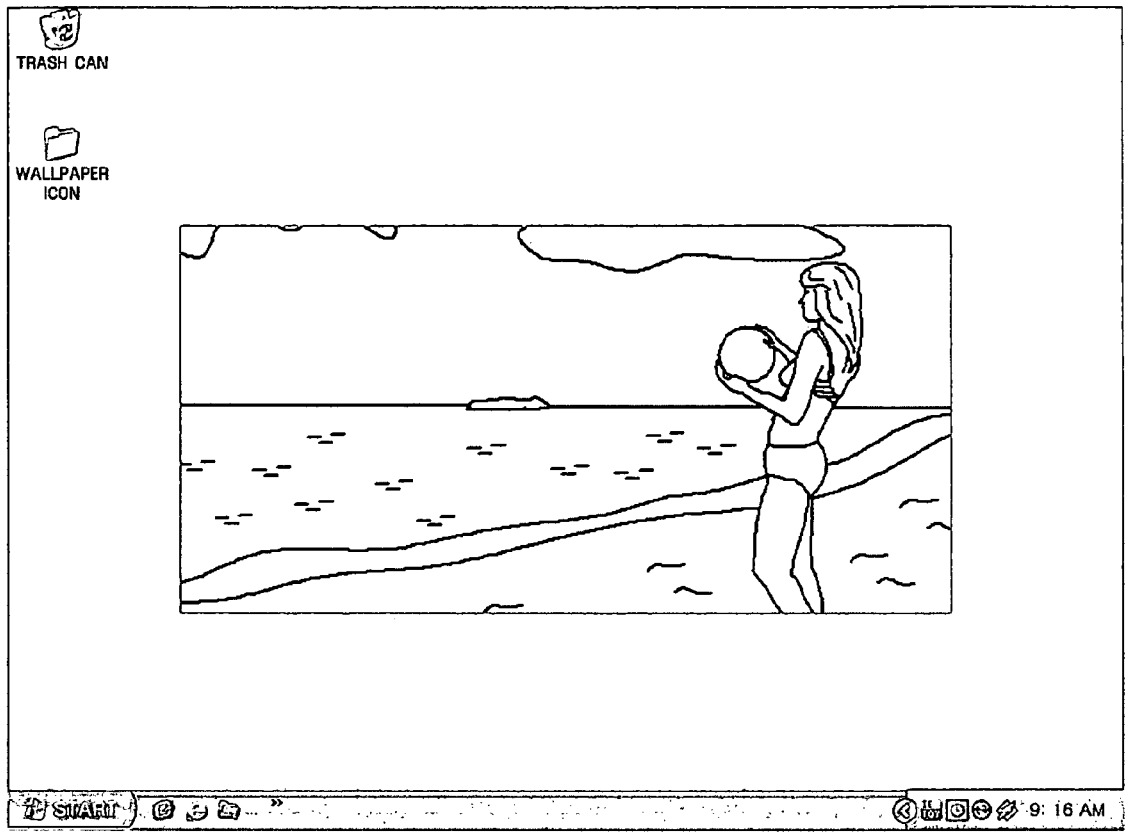
FIGS. 1A, 1B, and 1C are diagrams illustrating cases in which an input image is smaller than a wallpaper area in a method of displaying the wallpaper according to the conventional art.
Figure 1B:
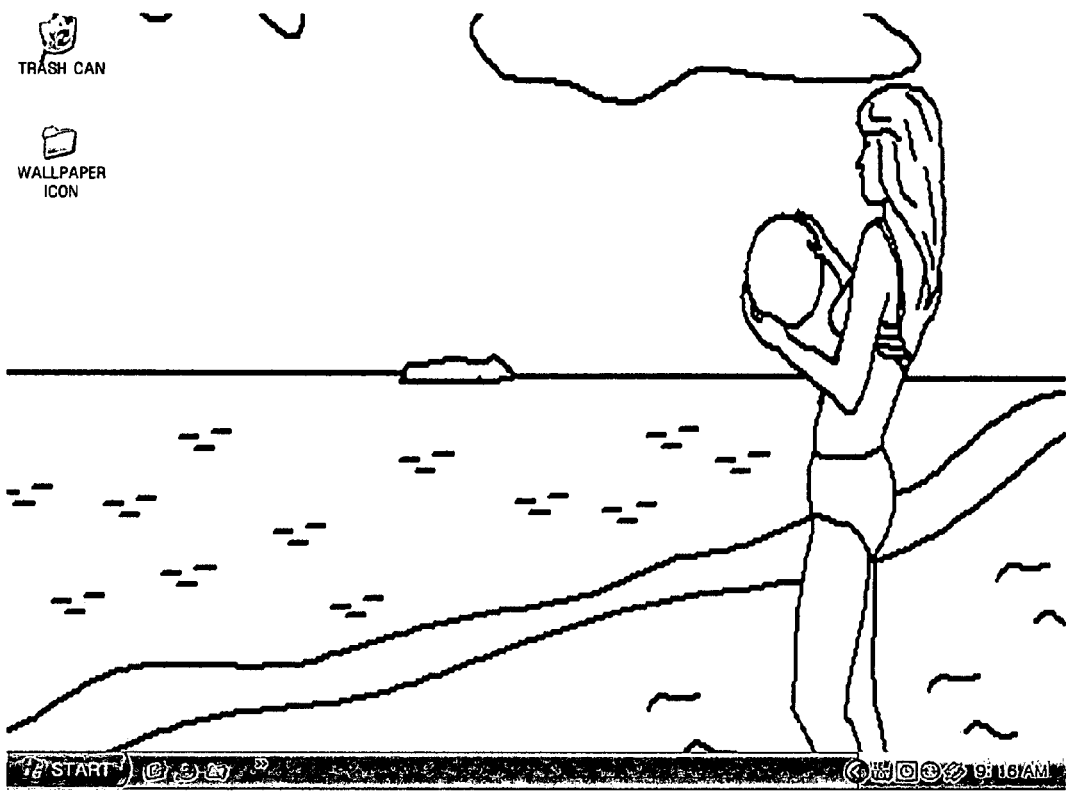
Figure 1C:
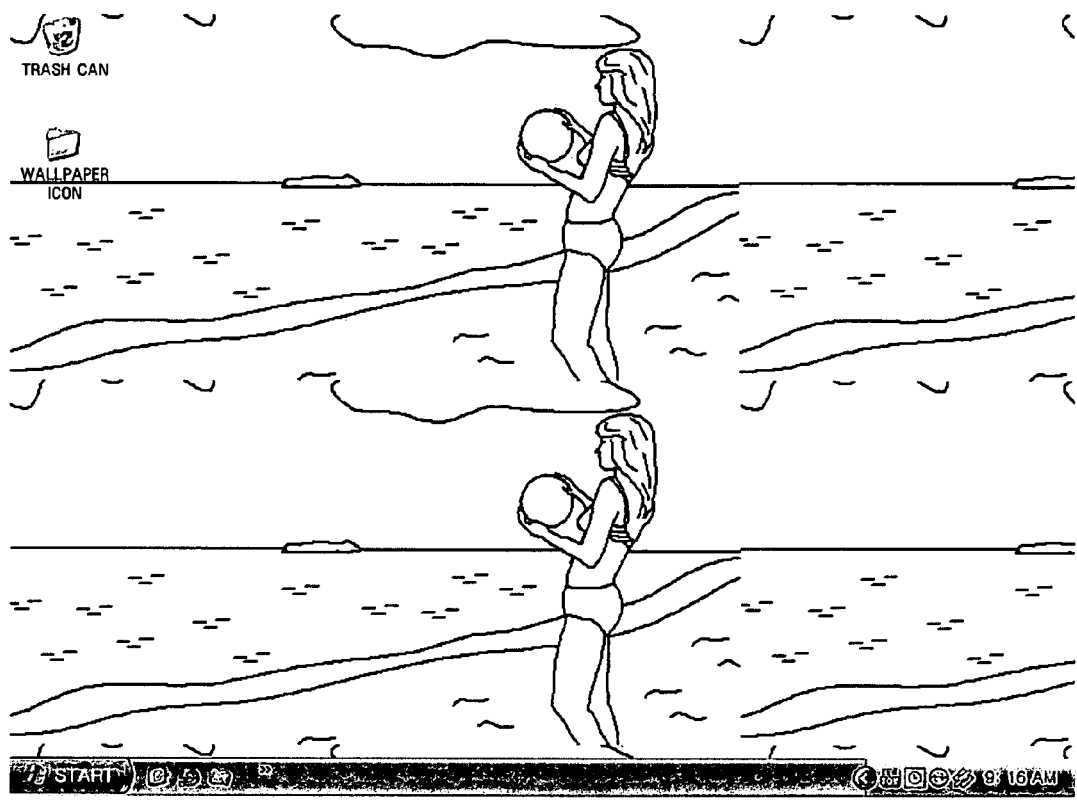
Figure 2A:
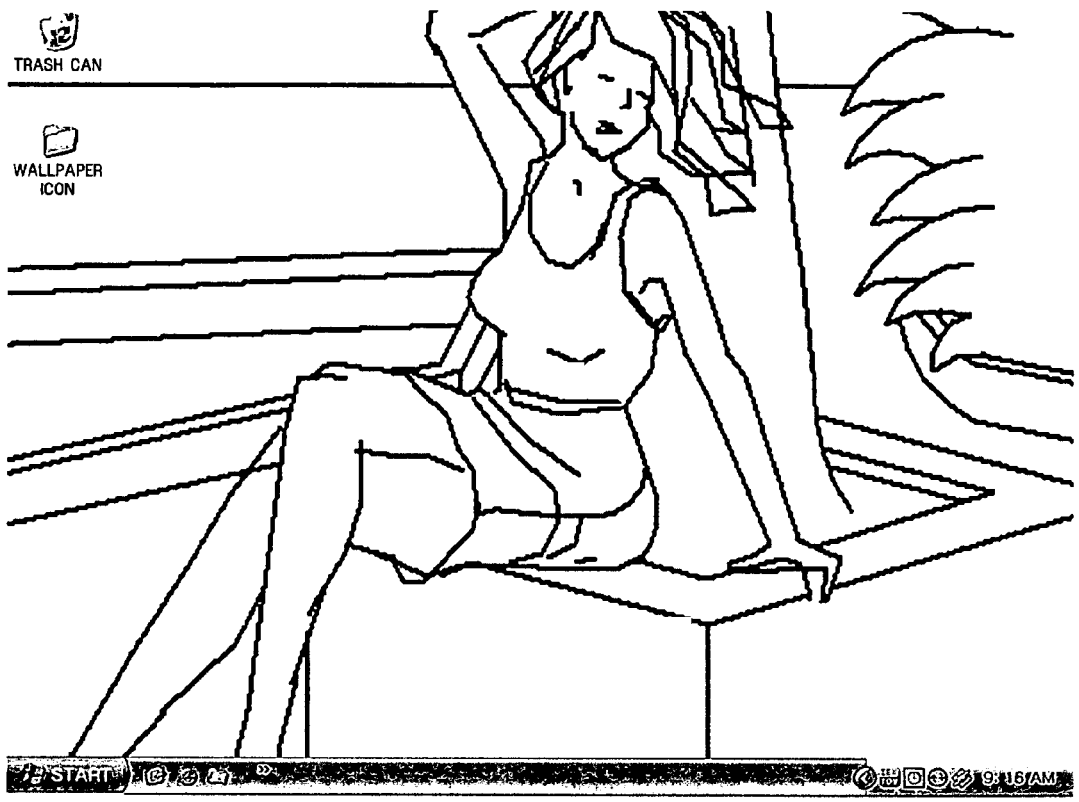
FIGS. 2A, 2B, and 2C are diagrams illustrating cass in which an input image is larger than a wallpaper area in a method of displaying the wallpaper according to the conventional art.
Figure 2B:
Figure 2C:
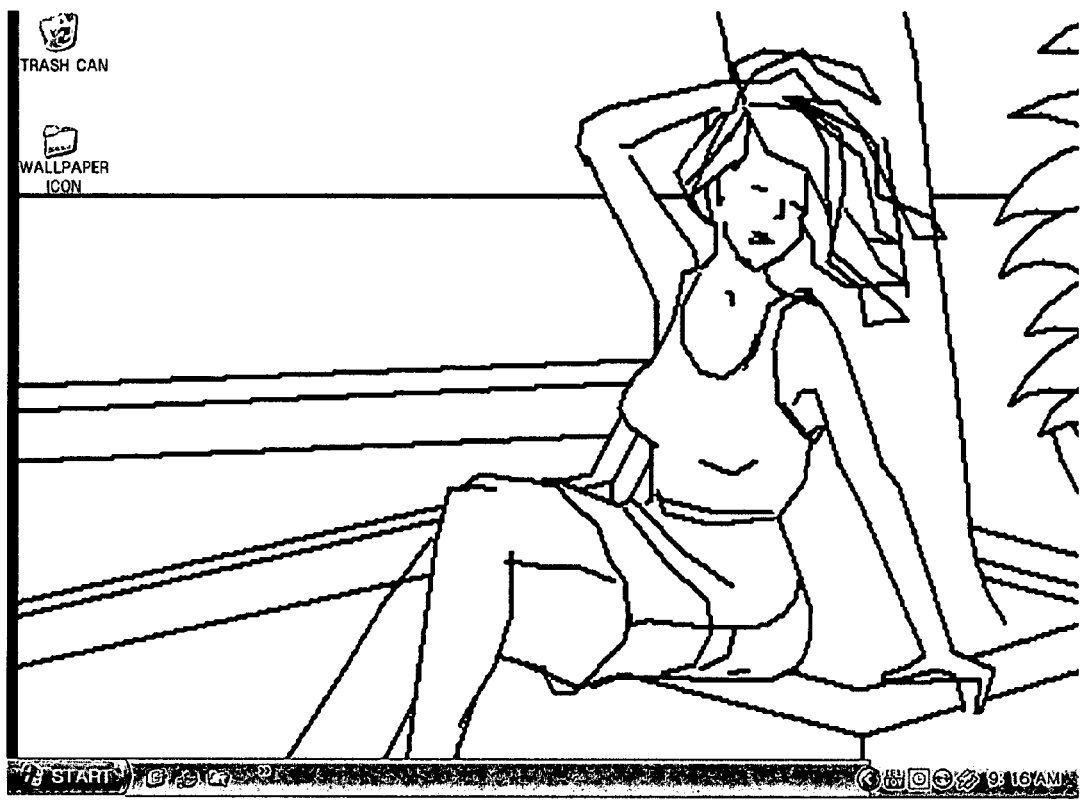

Subject matter and features of the aspects of the present invention will be covered by the detailed description and accompanying drawings.

Advantages and features of the aspects of the present invention and methods of accomplishing the same may be understood more readily by reference to the following detailed description of various aspects of the present invention and the accompanying drawings. Aspects of the present invention may, however, be embodied in many different forms and should not be construed as being only limited to the aspects set forth herein. Rather, these aspects are provided so that this disclosure will be thorough and complete and will fully convey the concept of the various aspects of the present invention to those skilled in the art, and the aspects of the present invention will only be defined by the appended claims. Like reference numerals refer to like elements throughout the specification.

For better understanding of the various aspects of the present invention, without narrowing the scope, some of the terms used in the various aspects of the present invention are described herein before the detailed description of the various aspects of the present invention is given.

Terminology

Wallpaper: background of an operating system (OS) or other applied programs, which is mainly picture, image, or other graphic representation.

Resolution: numerical pixel values indicating the width and height of a display apparatus.

Scaling: changing the size of an image at a users' request.

Click & Drag: moving an item by pointing to it, pressing a mouse button, and holding and dragging the item.

Input image: image before being used as a wallpaper.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
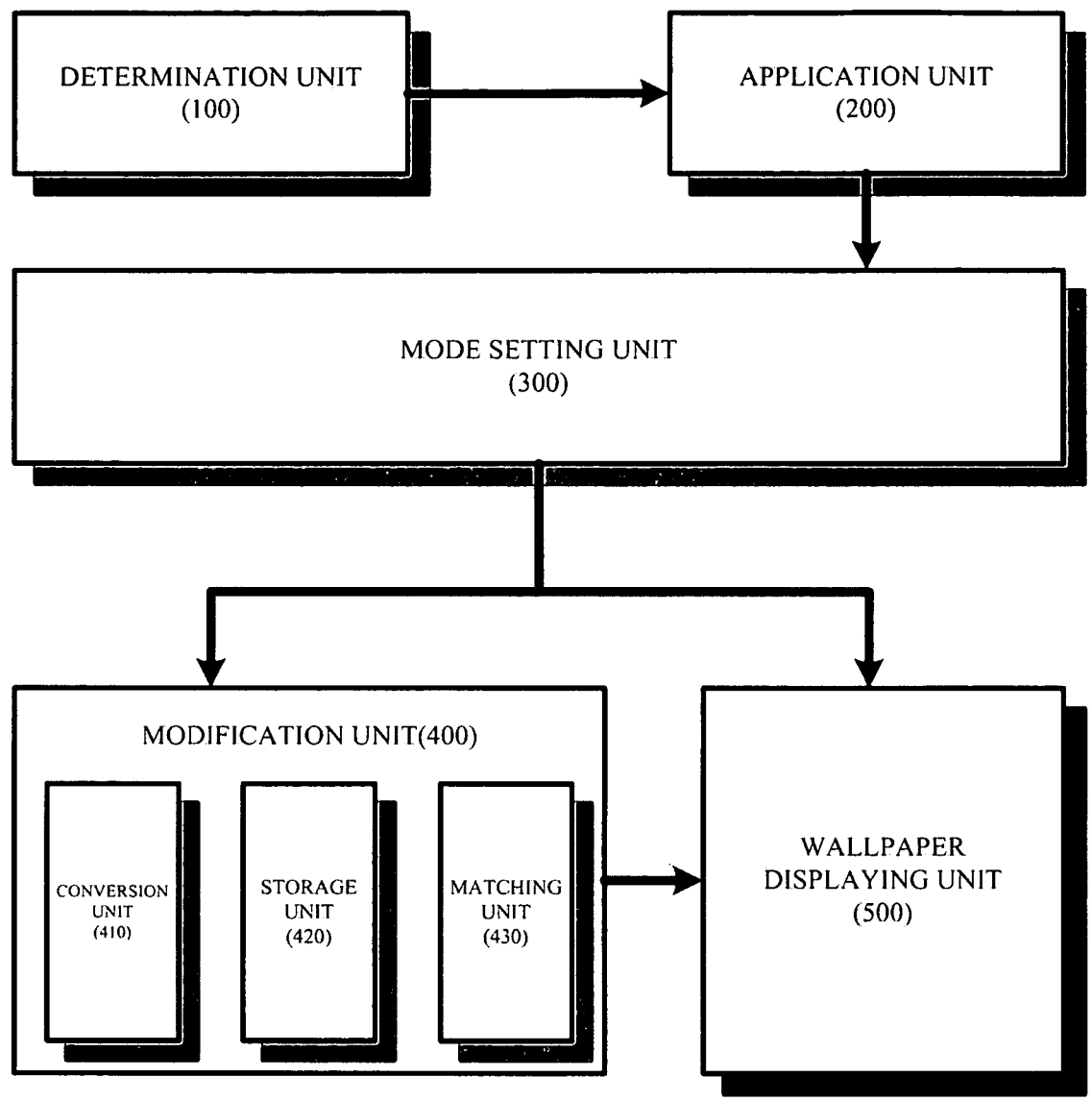
FIG. 3 is a diagram illustrating the configuration of a wallpaper displaying apparatus according to an aspect of the present invention.
Figure 5:
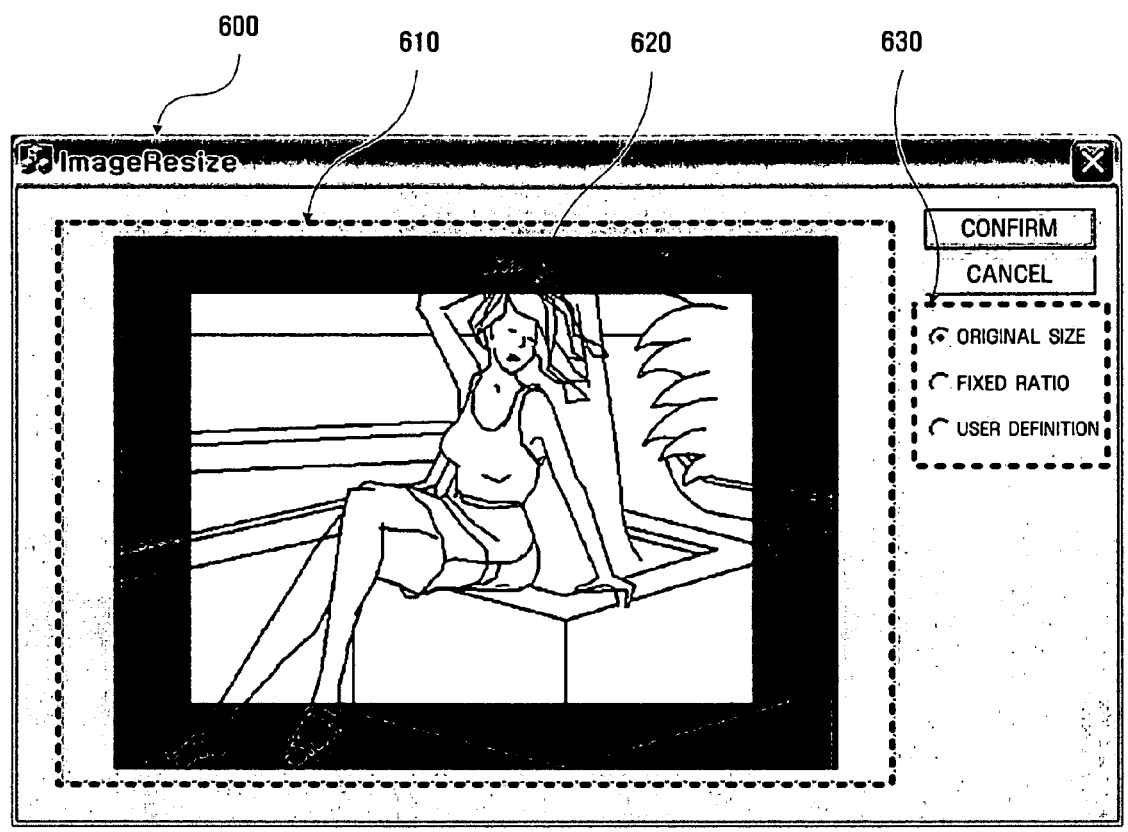
FIG. 5 is a diagram illustrating the configuration of a wallpaper setting window according to an aspect of the present invention.

FIG. 3 is a diagram illustrating the configuration of a wallpaper displaying apparatus according to an aspect of the present invention, and FIG. 5 is a diagram illustrating the configuration of a wallpaper setting window according to an aspect of the present invention.

The wallpaper displaying apparatus includes a determination unit 100, an application unit 200, a mode setting unit 300, a modification unit 400, and a wallpaper displaying unit 500. The modification unit 400 includes a conversion unit 410, a storage unit 420, and a matching unit 430.

The wallpaper displaying apparatus can display an image as a wallpaper, and more specifically, as a wallpaper of a desk-top computer, notebook computer, PDA, cellular phone, and other devices. It is understood that any type of displays or devices with displays capable of displaying an image or a graphic representation is within the scope of the present invention.

In reference to FIG. 3, the determination unit 100 compares the size of an input image to be displayed as a wallpaper with that of the wallpaper area. The determination unit 100 then outputs a result of the comparison. It is understood that the wallpaper area need not exactly coincide with a display area, and can in fact be larger or smaller than an actual display area of the display.

The application unit 200 is involved in the configuration of a User Interface (UI) of an application which enables the coordination of the size, location, and ratio of the wallpaper in any mode based on a user's instruction, and is involved in displaying a modified input image obtained by multiplying the size of the input image by a predetermined ratio based on the result of the comparison output by the determination unit 100.

Once a user selects an area that includes the entire input image or a part of the input image to display on a wallpaper setting window 600 (as shown in FIG. 5), the application unit 200 displays a frame area on the wallpaper setting window 600 with dimensions that correspond to the value obtained by multiplying the size of the wallpaper area by a predetermined ratio.

The mode setting unit 300 is involved in setting a mode to display the input image on a wallpaper setting window 600, which will be described hereinafter. There are various methods for setting a mode, but for convenience, only three mode settings are described in various aspects of the present invention. That is, these mode settings are the original size mode, fixed ratio mode, and user defined mode, and they are described below. The modification unit 400 is in charge of accomplishing the modification instructions given by a user after a user clicks on the frame area that includes the entire input image or a part of the image for a wallpaper in a mode set by the mode setting unit 300, and then gives instructions to modify the size, location, and ratio of that frame area, and at the same time, calculates the modified lengths and coordinates of the frame area to match with the lengths and coordinates of the wallpaper area. Specifically, the conversion unit 410 converts the width and height of the frame area into an appropriate width and height of the frame area (hereinafter, referred to as "actual width" and "actual height"), which will be used in the display of the original input image, by dividing the width and height of the frame area by the predetermined ratio.

The modification unit 400 can change the frame area location in the original size mode, the location and the size of the frame area in the fixed ratio mode, and the location, size, and the width to height ratio of the frame area in the user-defined mode. That is, the adjustment is least limited in the user-defined mode, and most limited in the original size mode. The modification instructions are inputted by clicking and dragging the frame area, or by clicking and dragging on the frame area, by a user.

The predetermined ratio for converting the width and the height of the frame area is determined differently depending on whether the resolution (and/or the size) of the input image is higher (and/or larger) or lower (and/or smaller) than that of the wallpaper area. If the resolution (and/or the size) of the input image is higher (and/or larger) than that of the wallpaper, the predetermined ratio is set to the value obtained by dividing the size of the wallpaper setting window 600 by the size of the input image. If the resolution (and/or the size) of the input image is lower (and/or smaller) than that of the wallpaper area, the predetermined ratio is set to the value obtained by dividing the size of the wallpaper setting window 600 by the size of the wallpaper area.

The storage unit 420 stores the upper-left apex coordinates of the frame area converted by the conversion unit 410, and the lengths of the converted width and height, as separate variables.

The matching unit 430 matches one of the variables regarding the converted upper-left apex coordinates with the origin coordinates of the wallpaper, and matches another of the variable regarding the converted actual width and height with the above mentioned height and width of the wallpaper. While not required in all aspects, elements of the wallpaper displaying apparatus can be implemented as software and/or firmware for use with one or more processors, or may be combined into a single apparatus. Further, while not required in all aspects, a processor and/or computer readable medium may be encoded with computer and/or processor-executable instructions for performing the various functions of the wallpaper displaying apparatus. The wallpaper displaying unit 500 is involved in displaying the frame area modified by the modification unit 400 in the wallpaper area. The wallpaper setting window 600 illustrated in FIG. 5 refers to an application window for the determination of the size, location, and a width to height ratio of the input image to be used as a wallpaper according to a user's instruction in an aspect of the present invention. The part of the wallpaper setting window 600 shown within the dotted line is the part of the input image that a user wants to display 610, and the part enclosed by the dark solid bars indicates a wallpaper displaying frame area 620 of the input image which will actually be displayed in the wallpaper area. Further, the mode setting area 630 for setting the three background image modes is shown in the right part of the wallpaper setting window 600.

Figure 4A:
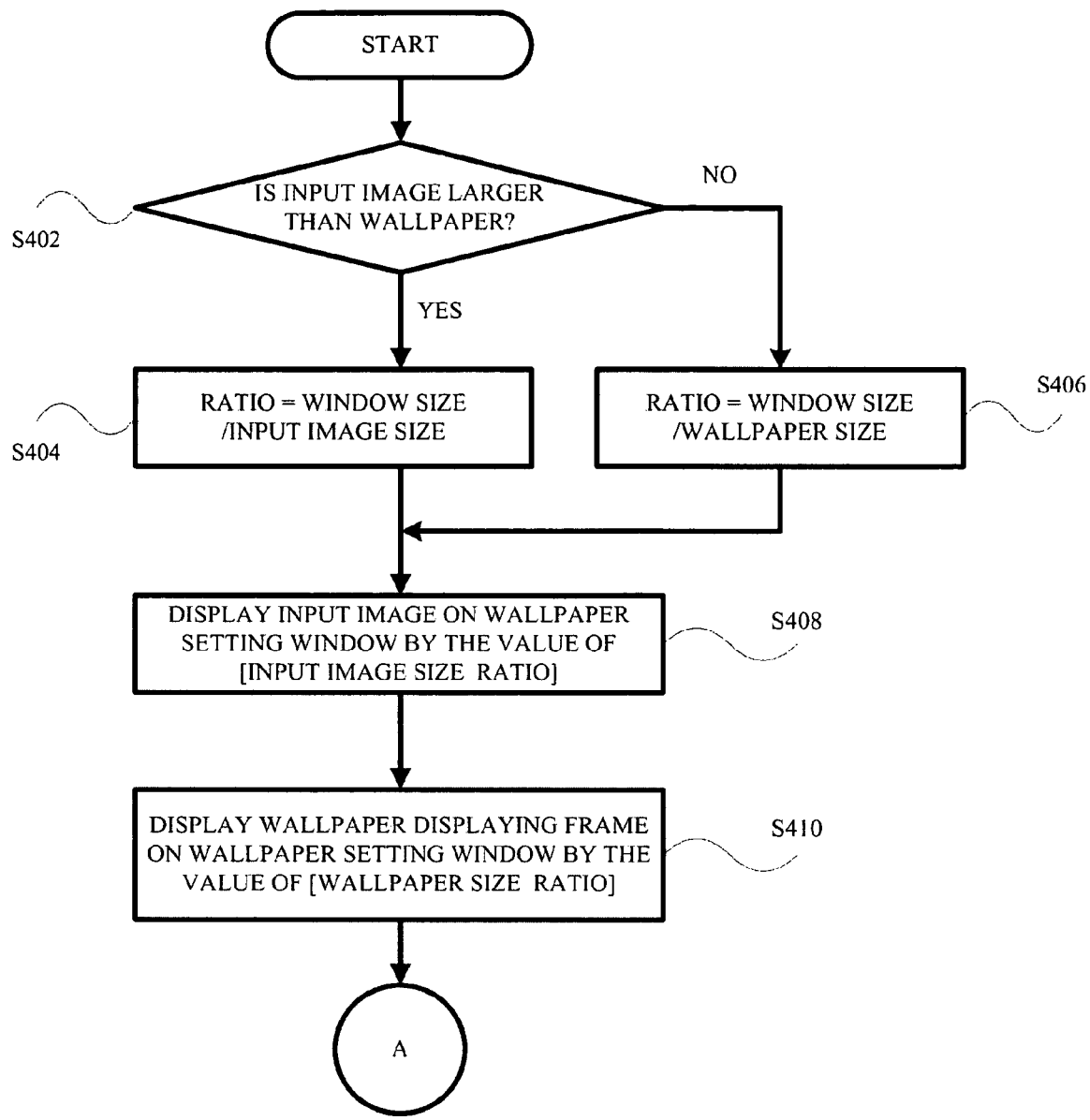
FIGS. 4A and 4B are flowcharts illustrating a method of displaying a wallpaper according to an aspect of the present invention.
Figure 4B:
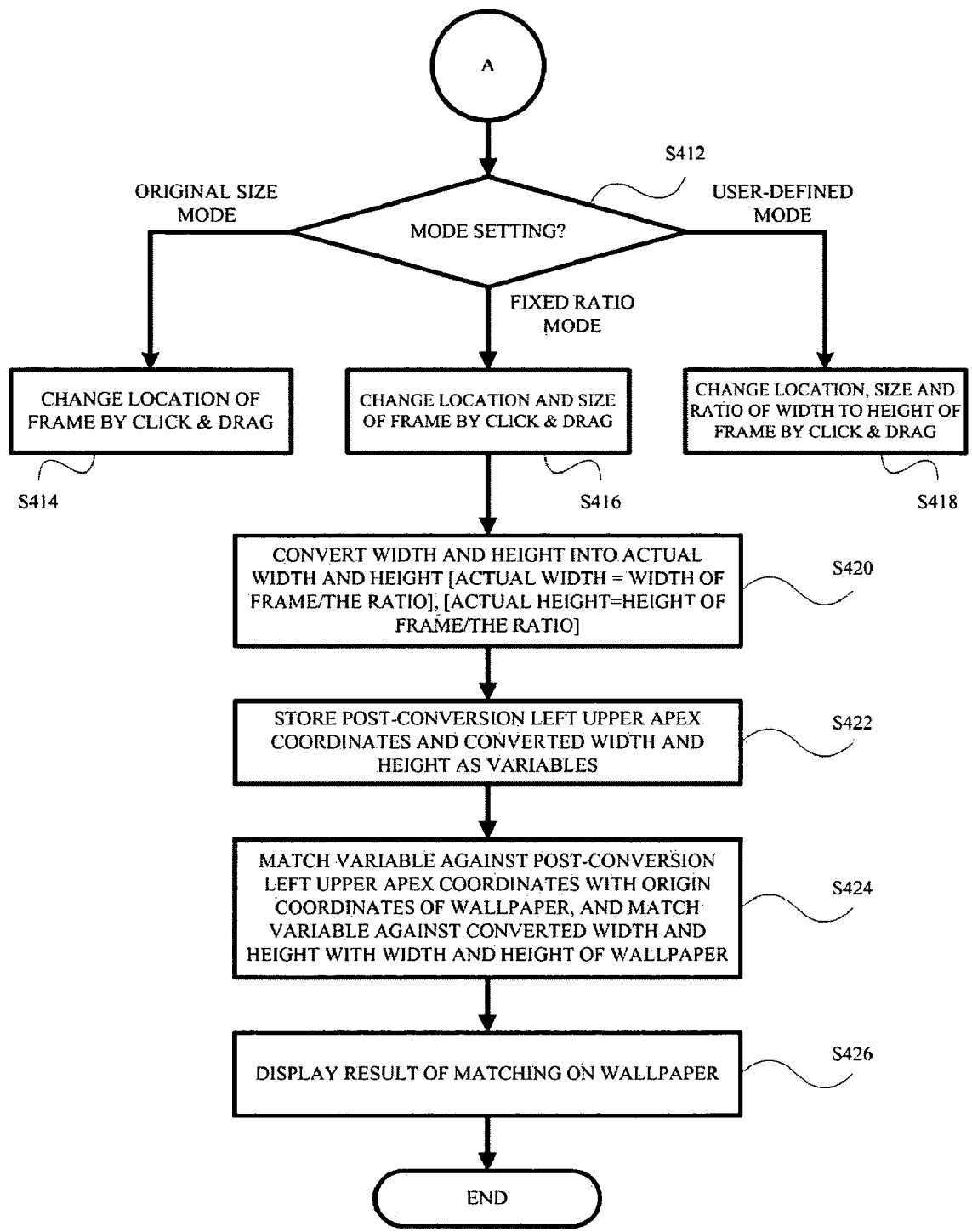

Methods of setting a background image, which are performed by a user, in each of the modes are described in more detail in the aspect of the present invention with reference to FIGS. 4A and 4B. FIGS. 4A and 4B are flowcharts illustrating a method of displaying a wallpaper according to an aspect of the present invention. The apparatus of FIG. 3 may be used to implement the method of FIGS. 4A-4B, but such use is not required. While not required in all aspects, elements of the method can be implemented as software and/or firmware for use with one or more processors. First, the determination unit 100 compares the size and/or the resolution of the input image that will be displayed in the wallpaper area to the size and/or the resolution of the wallpaper area (operation S402). If the input image is larger (and/or higher in resolution) than the wallpaper area, a predetermined ratio is determined by dividing the size (and/or the resolution) of the wallpaper setting window 600 by the size (and/or the resolution) of the input image (operation S404). If the input image is smaller (and/or lower in resolution) than the wallpaper area, the predetermined ratio is determined by dividing the size of the wallpaper setting window 600 by the size of the wallpaper area (operation S406), which is to match size (and/or the resolution) of the wallpaper area with the size (and/or resolution) of the wallpaper setting window 600. Hereinafter, although not required in all aspects, it is understood that the size and/or the resolution of the input image, wallpaper, and/or wallpaper area can be used in any comparison and/or determining the predetermined ratio.

On the basis of the determination of operation S402, when the input image is larger than the wallpaper area, the application unit 200 displays the input image obtained by multiplying the input image size by the predetermined ratio of operation S404 (operation S408) in order to match the input image with the size of the wallpaper setting window 600.

A user can specify a certain part of the input image to be displayed in the wallpaper area, which is displayed as a frame area 620. In addition, the size of the frame area 620 is determined (operation S410) by multiplying the size of the wallpaper area by the predetermined ratio that is the result of operation S404. FIG. 5 illustrates the performances of operations S408 and S410 when the input image is larger than the wallpaper area.

On the basis of the determination of operation S402, when the input image is smaller than the wallpaper, the application unit 200 displays the input image obtained by multiplying the input image size by the predetermined ratio of operation S406 (operation S408) so as to match the wallpaper area with the wallpaper setting window 600, and displays an image including the input image that a user wants to display as a frame area 620 obtained by multiplying the size of wallpaper by the predetermined ratio that is the result of operation S406 (operation S410).

Then, a user selects a mode from the above-described three mode settings. As shown, the mode setting unit 300 sets a mode to display the input image on the wallpaper setting window 600 according to a user's choice (operation S412). As described above, there are various modes. However, for convenience in this aspect of the invention, examples are limited to three modes: the original size mode, the fixed ratio mode and the user defined mode.

In one of the mode settings, the modification unit 400 sets a certain area that contains a part of or an entire input image to be displayed in a wallpaper area, then modifies the selected area according to the user selected mode setting. When the original size mode is selected or set, the location of the frame can be changed (operation S414). When the fixed ratio mode is selected or set, not only the location but also the size of the frame can be changed (operation S416). When the user defined mode is selected or set, the location, the size and the width to height ratio of the frame can be changed (operation S418). The modification is performed by a user using a mouse to perform click and drag of the frame area 620. It is understood that various other modes may be used to modify the input image, such as rotation mode to rotate the frame location, for example.

The conversion unit 410 divides the width and height of the frame area 620 displayed in the wallpaper setting window 600 by the predetermined ratio determined by operations S404 or S406, which converts the width and height of the frame area 620 into an actual (and/or an appropriate) width and height of the frame to be displayed on (and/or over) the original input image (operation S420).

The storage unit 420 stores the upper-left apex coordinates of the frame area 620 converted by the conversion unit 410, and the converted actual width and height as variables (operation S422). Further, the matching unit 430 matches the variable against the converted upper-left apex coordinates with origin coordinates of the wallpaper area, and matches the variable against the actual width and height with the width and height of the wallpaper area, being ready to display the target image on the wallpaper area (operation S424). Lastly, a certain area that a user wants to display is displayed on the wallpaper area by the wallpaper displaying unit 500, which means that the coordinated area that is the result of the matching of operation S424 is displayed on the wallpaper area (operation S426).

The applications of the above aspects in view of the three different modes are described in detail hereinafter.

Figure 6A:
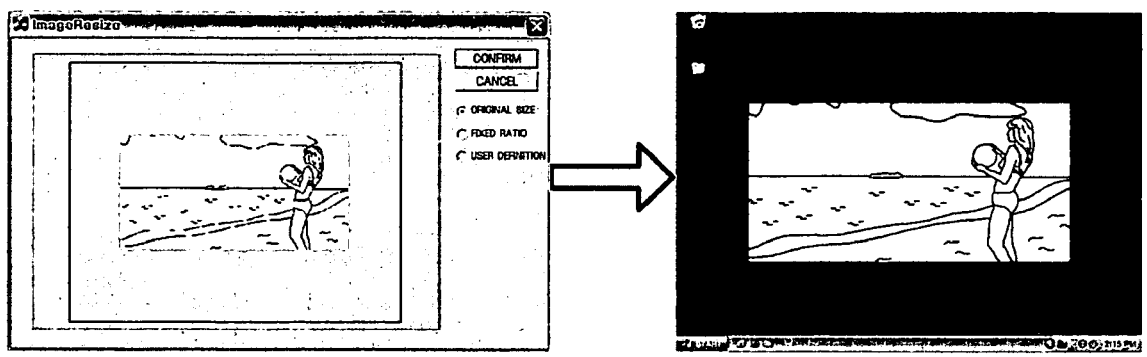
FIG. 6A is a diagram illustrating cases in which a background image is smaller than a wallpaper area in an original size mode according to an aspect of the present invention.
Figure 6A:
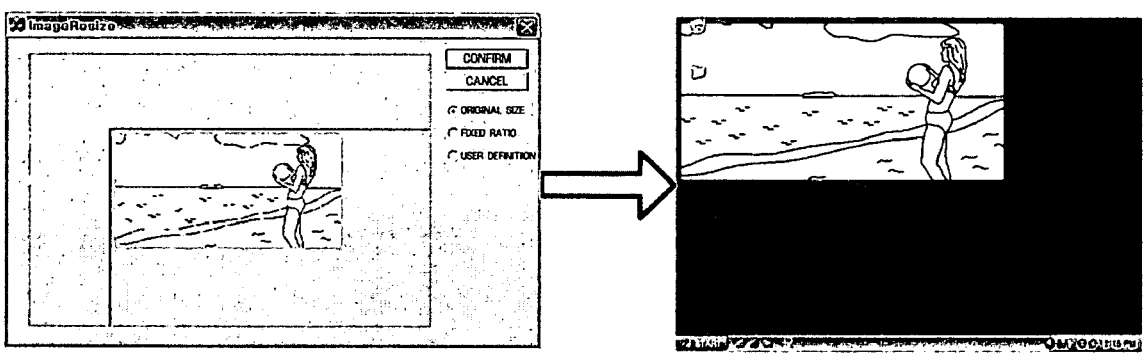
Figure 6B:
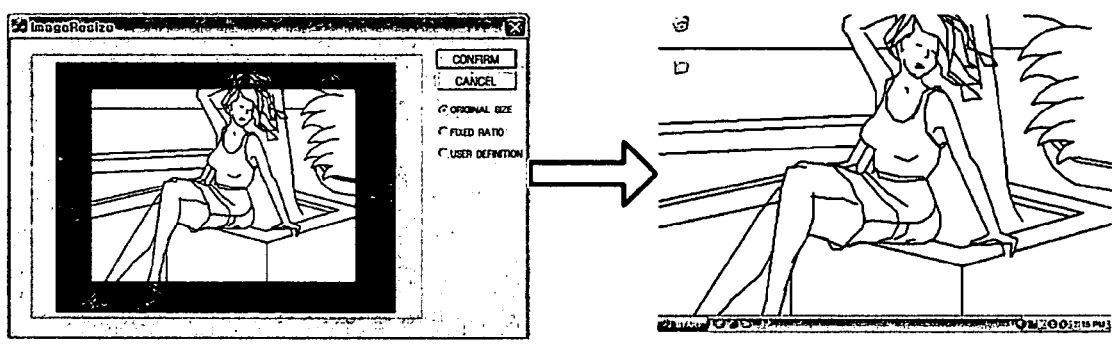
FIG. 6B is a diagram illustrating cases in which a background image is larger than a wallpaper area in an original size mode according to an aspect of the present invention.
Figure 6B:
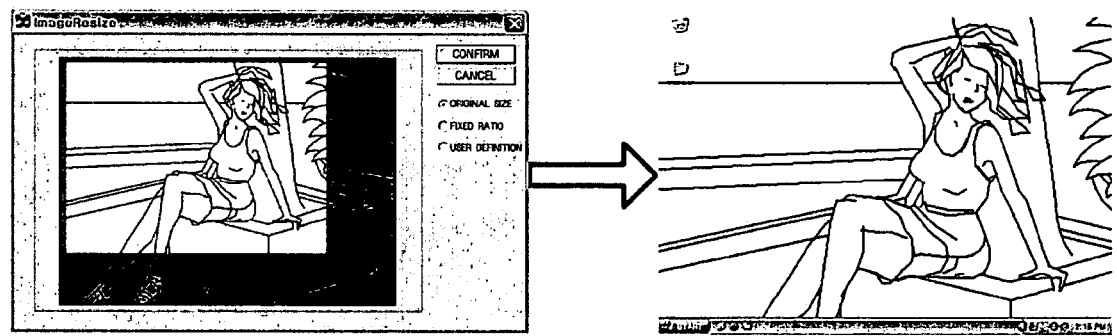

FIG. 6A is a diagram illustrating a case in which an input image is smaller than a wallpaper area in an original size mode in accordance with the first aspect of the present invention, and FIG. 6B is a diagram illustrating a case in which an input image is larger than a wallpaper area in an original size mode. In FIG. 6A, the upper picture and the lower picture show the different frame settings depending on the location of a background image on the wallpaper area. In FIG. 6B, the upper picture and the lower picture show different frame settings depending on which part of a background image will be displayed on the wallpaper area.

The interior area of the frame area 620 in the pictures is the area to be displayed on the wallpaper of a monitor. In the "original size" mode, the size and ratio of the frame area 620 are fixed and only the location of the frame area 620 relative to the input image can be coordinated (and/or adjusted). To do so, a user clicks on the frame area 620 and drags it to wherever (s)he wants relative to the input image. In this mode, the input image is displayed on the wallpaper area with the same resolution as the actual resolution of the original image. An advantage of this mode is that the actual resolution and the width to height ratio of the original image are maintained to display very clearly (without distortion) a background image (and/or a portion thereof) in the location as requested by a user.

As shown in FIG. 6A, the frame area 620 is shown as being larger than the input image. As a result, the input image is positioned near the center of the wallpaper setting window 600 as shown in the upper figure of FIG. 6A, and the input image is positioned within the frame area 620, which represents the size of the wallpaper. Therefore, if the user accepts the positioning of the input image as shown, the input image will be positioned as a wallpaper in about the center of the wallpaper area. Alternatively, the user may click on the frame area 620 to drag the frame area 620 relative to the input image as shown in the lower figure of FIG. 6A. Therein, the input image is located in the upper left side of the frame area 620. The location of the input image represents a final position of the input image in the wallpaper area when used as a wallpaper. Therefore, if the user accepts the positioning of the input image as shown, the input image will be positioned as a wallpaper in the upper left corner of the wallpaper area as shown the lower figure of FIG. 6A.

In FIG. 6B, the input image is shown as being larger than the frame area 620. As a result, peripheral portions of the input image lie outside the frame area 620. Those portions are shown as being within the dark bars while the portions within the frame area 620 are shown not darkened. As shown in the upper figure of FIG. 6B, the frame area 620 is positioned over the center portion of the input image. Therefore, if the user accepts the positioning of the frame area as shown, the input image will be shown without the portion lying outside the frame area 620 as shown in the upper figure of FIG. 6B.

Alternatively, the user may click on the frame area 620 to drag the frame area 620 relative to the input image to any position within the input image, as shown in the lower figure of FIG. 6B. Therein the frame area 620 has been dragged to the upper left side of the input image so that most of the upper left side of the input image is visible while portions in the lower right side of the input image lie outside the frame area 620 and are dark. Therefore, if the user accepts the positioning of the area 610 as shown, most of the upper left side of the input image will be shown, while most of the lower and right sides of the input image will not be shown once the modified input image is used as a wallpaper. It is understood that the input image, rather than the frame area 620 may be clicked and dragged to reposition the input image within the frame area 620. It is understood that the darkened bar may be indicated by other colors, shades, images, effects, or as a ghost (e.g., transparent but showing only an outline), etc.

In FIG. 6A, when the input image for use as a background image is smaller than the wallpaper area, the remaining area of the wallpaper is filled with a background color selected by a user. In FIG. 6B, there is no remaining area to fill with a background color selected by a user. It is understood that the remaining area may be filled by shades, images, effects such as scrolling, or as a ghost (e.g. transparent and showing only an outline), etc.

Figure 7A:
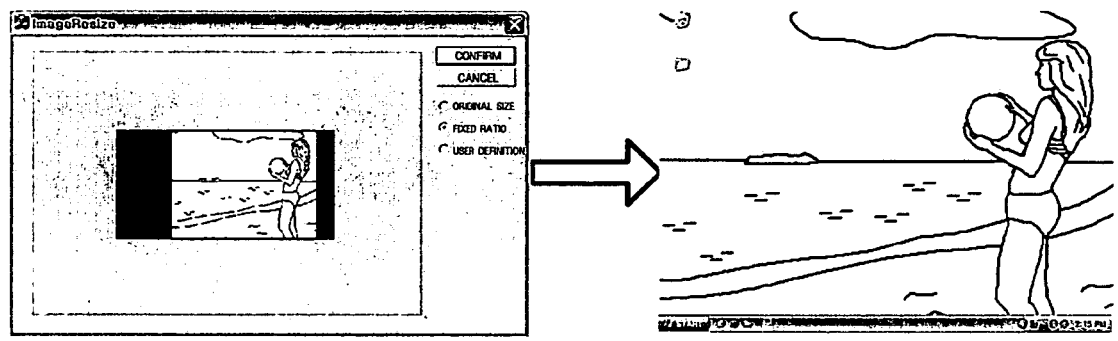
FIG. 7A is a diagram illustrating cases in which a background image is smaller than a wallpaper area in a fixed ratio mode according to an aspect of the present invention.
Figure 7A:
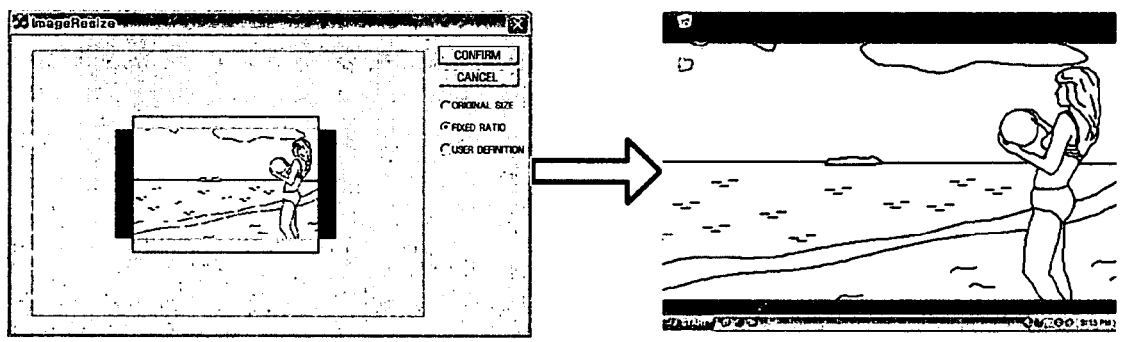
Figure 7B:
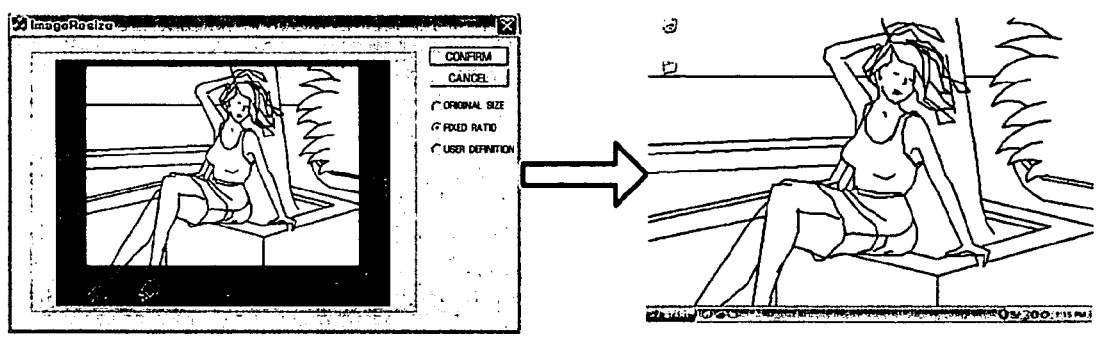
FIG. 7B is a diagram illustrating cases in which a background image is larger than a wallpaper area in a fixed ratio mode according to an aspect of the present invention.
Figure 7B:
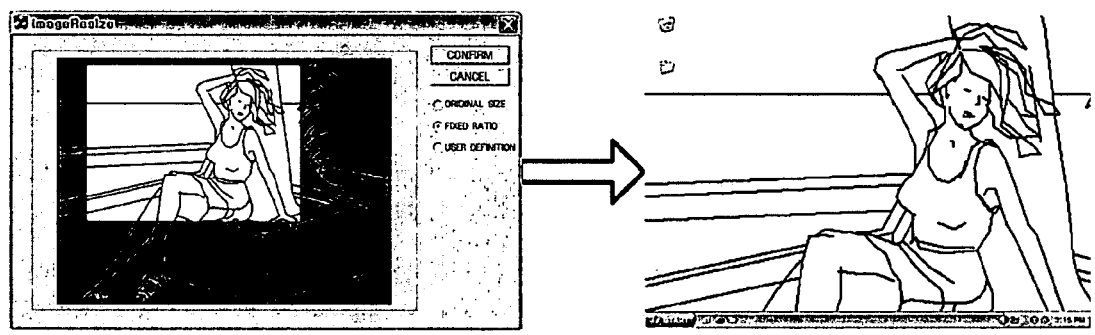

FIG. 7A is a diagram illustrating a case in which a background image is smaller than the wallpaper area in the fixed ratio mode setting according to an aspect of the present invention, and FIG. 7B is a diagram illustrating a case in which a background image is larger than the wallpaper area in the fixed ratio mode setting according to an aspect of the present invention.

In the "fixed ratio" mode, the width to height ratio of the frame area 620 is fixed but the location and the size of the frame area 620 can be adjusted. The frame area 620 is not yet displayed by the first click of the "fixed ratio" mode setting, but frame area 620 is shown when a user clicks & drags a target area (or a pre-frame area). The width to height ratio is not changed even if a user changes the size of the frame area 620. Once the frame area 620 is made or generated, and then displayed, the location of the frame area 620 can be changed by a simple click and drag of the mouse, in the same manner as in the original size mode setting discussed above. Further, the size of the frame area 620 is adjusted as desired by a user while maintaining the width to height ratio of the frame area 620. Therefore, the locations and the sizes of the frame area 620 can be independently adjusted in the fixed ratio mode.

As shown in FIG. 7A, in the upper figure, the frame area 620 is shown as being narrower in the width direction than the input image but being equal with the height of the input image. Because the frame area 620 is narrower than the input image, a large portion on the right side of the input image and a small portion on the left side of the input image will not be included within the frame area 620. Thus, when a user accepts the positioning of the frame area 620 as shown, a wallpaper of the input image will exclude the large area on the left side and the small area on the right side of the input image as shown in the upper figure of FIG. 7A. Nevertheless, the full height of the input image will be displayed.

The frame area 620 may be adjusted to display more of the input image than as shown in the upper figure of FIG. 7A. In the lower figure of FIG. 7A, the frame area 620 is shown as being narrower in the width direction than the input image but being taller in the height direction of the input image, than as shown in the upper figure of FIG. 7A. Compared to that of the upper figure of FIG. 7A, the frame area 620 has been enlarged to include more of the left side of the input image. As a result, a smaller portion of the left side of the input image is excluded from the frame area 620. However, as the width to height ratio of the frame area is kept constant, the height of the frame area 620 is increased accordingly so that the height of the frame area 620 exceeds the upper and lower boundaries of the input image. Thus, when a user accepts the positioning of the frame area 620 as shown, the wallpaper of the input image will not completely fill the entire wallpaper area of the display. The remaining area of the wallpaper is filled with a background color selected by a user, but it is understood that the remaining area may be filled by shades, images, effects such as scrolling, or as a ghost (e.g. transparent and showing only an outline), etc.

FIG. 7B shows an input image that is larger than the wallpaper area. In FIG. 7B, the input image is shown as being larger than the frame area 620. As a result, peripheral portions of the input image lie outside the frame area 620. Those portions are shown as being within the dark bars while the portions within the frame area 620 are shown not darkened. As shown in the upper figure of FIG. 7B, the frame area 620 is positioned over the center portion but slightly shifted to the top portion of the input image. Therefore, if the user accepts the positioning of the frame area as shown, the input image will be shown without the portion lying outside the frame area 620 as shown in the upper figure of FIG. 7B.

Alternatively, the user may click on the frame area 620 to adjust the size of the frame area 620 but without changing the width to height ratio of the frame area, shown in the lower figure of FIG. 7B. Therein, the frame area 620 is contracted to show mostly the upper left part of the input image, by clicking and dragging the frame area 620. Therefore, if the user accepts the positioning of the frame area 620 as shown, mostly the upper left side of the input image will be shown, while most of the lower and right sides of the input image will not be shown once the modified input image is used as a wallpaper. It is understood that the frame 620 may also be moved to any position of the input image independently of the adjustment in the size of the frame area 620. It is also understood that the input image, rather than the frame area 620 may be clicked and dragged to reposition and/or adjust the size of the input image within the frame area 620. It is understood that the darkened bar may be indicated by other colors, shades, images, effects, or as a ghost (e.g., transparent but showing only an outline), etc.

Here, the input image will be displayed on the wallpaper as a frame area 620 whose resolution is modified to match that of the wallpaper area of a monitor (or a display) by the scaling of operations S420 or S424. By the use of this mode, an image can be reduced or enlarged to the size requested by a user regardless of the size of an original image, and no distortion occurs because the width to height ratio is fixed.

Figure 8A:
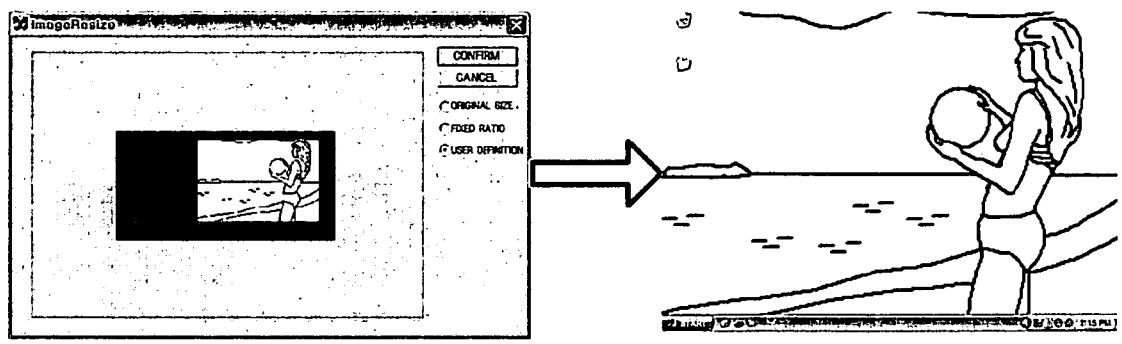
FIG. 8A is a diagram illustrating cases in which a background image is smaller than a wallpaper area in a user-defined mode according to an aspect of the present invention.
Figure 8A:
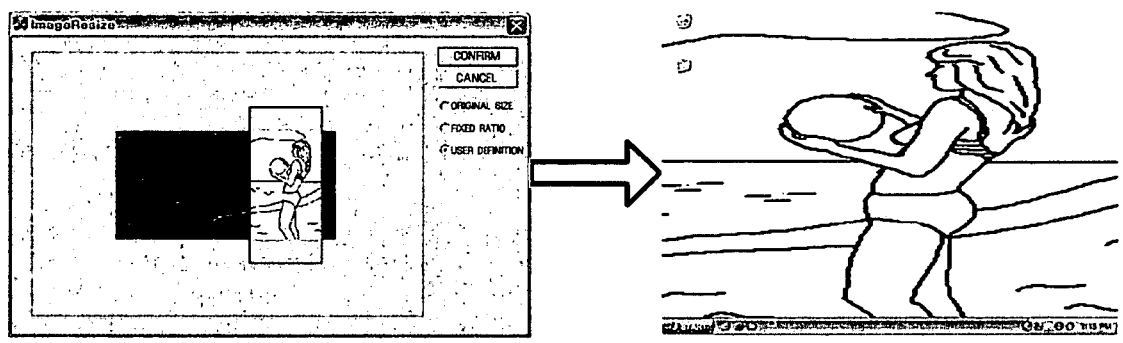
Figure 8B:
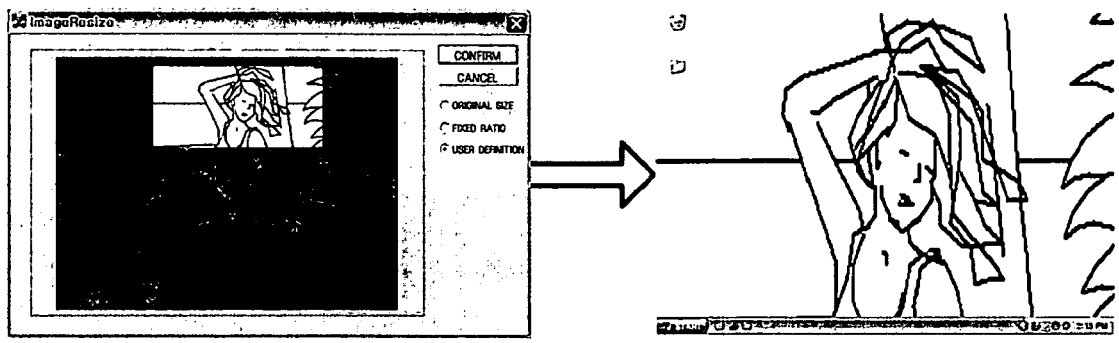
FIG. 8B is a diagram illustrating cases in which a background image is larger than a wallpaper area in a user-defined mode according to an aspect of the present invention.
Figure 8B:
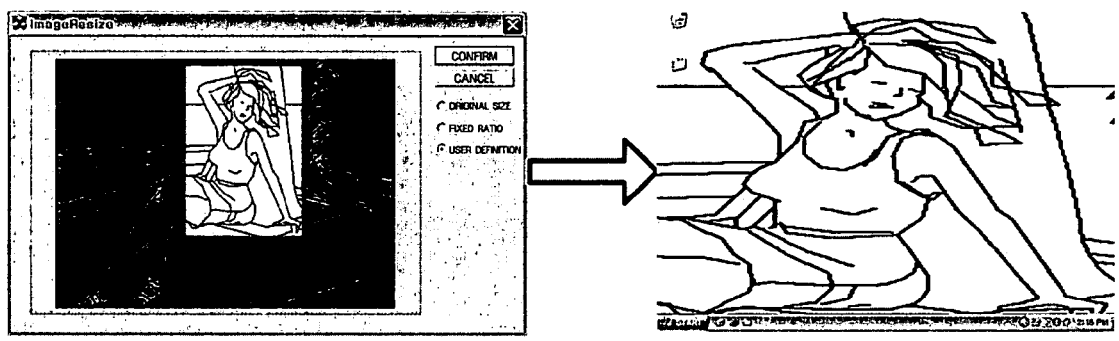

FIG. 8A is a diagram illustrating a case in which a background image is smaller than wallpaper under the user-defined mode setting according to an aspect of the present invention, and FIG. 8B is a diagram illustrating a case in which a background image is larger than the wallpaper in the user-defined mode setting according to an exemplary aspect of the present invention.

When the user-defined mode is selected, the location, size, and the width to height ratio of the frame can be changed. Even though the coordination is carried out in the same manner as performed in the fixed ratio mode, the ratio is not fixed, unlike in the fixed ratio mode, so that an image of the frame is displayed on a wallpaper of a monitor by operations S420 to S424 at the resolution of the wallpaper regardless of the width to height ratio.

Thus, the alteration can be most freely performed under the setting of the user-defined mode, and the same displaying result as that of the fixed ratio mode and the original size mode is obtainable in the user-defined mode. When the fixed ratio mode is set, the same display result as that of the original size mode is also obtainable, suggesting that the original size mode is most limited in displaying an image on a wallpaper.

It should be understood that the scope and spirit of the present invention also include a recording medium recording a computer-readable program necessary for carrying out the method of displaying wallpaper described in the above aspects of the present invention.

It will be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as a limitation of the invention.

According to an aspect of the present invention described in detail hereinbefore, a user can decide the location, size and ratio of width to height to display an image he wants on a wallpaper, which provides a user with several options for displaying an input image on a wallpaper without distorted the image.

The effects of the present invention are not limited to the aspects set forth herein. It should be understood that other effects of the present invention not described hereinbefore will be defined by the appended claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of displaying wallpaper, comprising:
    displaying an input image as a background image and a wallpaper displaying frame area containing the entire input image and/or a part of the input image on an area of a wallpaper setting window;
    modifying the wallpaper displaying frame area according to a user's instruction; and
    displaying the modified wallpaper displaying frame area on a wallpaper setting window;
    wherein, when the wallpaper displaying frame area is larger than the background image, the modifying of the wallpaper displaying frame area comprises changing a location of the wallpaper displaying frame area relative to the input image according to the user's instruction.

2. The method of claim 1, wherein the displaying of the input image and the wallpaper displaying frame area includes:
    comparing the size of the input image with the size of a wallpaper area;
    displaying the modified image of the input image obtained by multiplying the size of the input image by a predetermined ratio on the wallpaper setting window on the basis of the result of the comparison; and
    displaying on the wallpaper setting window the wallpaper displaying frame area obtained by multiplying the size of the wallpaper area by the predetermined ratio.

3. The method of claim 2, wherein the predetermined ratio is determined by dividing the size of the wallpaper setting window by the size of the input image when the input image is larger than the wallpaper area, and by dividing the size of the wallpaper setting window by the size of the wallpaper area when the input image is smaller than the wallpaper area.

4. The method of claim 1, wherein the modifying of the wallpaper displaying frame area includes:
setting a mode to display the input image on the wallpaper setting window; and
modifying the selected wallpaper displaying frame area in the set mode according to a user's instruction.

5. The method of claim 4, wherein the mode selectively includes an original size mode, a fixed ratio mode and a user-defined mode.

6. A computer readable recording medium, which records a computer-readable program implementing the method of displaying wallpaper according to claim 1.

7. A method of displaying wallpaper, comprising:
displaying an input image as a background image and a wallpaper displaying frame area containing the entire input image and/or a part of the input image on an area of a wallpaper setting window;
modifying the wallpaper displaying frame area according to a user's instruction; and
displaying the modified wallpaper displaying frame area on a wallpaper setting window;
wherein the modifying of the wallpaper displaying frame area includes:
setting a mode to display the input image on the wallpaper setting window, the mode selectively including an original size mode, a fixed ratio mode, and a user-defined mode; and
modifying the selected wallpaper displaying frame area in the set mode according to a user's instruction; and
wherein, during the modifying of the wallpaper displaying frame area, when the original size mode is set, the location of the wallpaper displaying frame area in the wallpaper setting window is changed, when the fixed ratio mode is set, the location and the size of the wallpaper displaying frame area is changed in the wallpaper setting window, and when the user-defined mode is set, the location, size and ratio of width to height of the wallpaper displaying frame area is changed in the wallpaper setting window.

8. The method of claim 7, wherein the changes are performed by clicking or dragging a mouse on the wallpaper displaying frame area.

9. A method of displaying wallpaper, comprising:
displaying an input image as a background image and a wallpaper displaying frame area containing the entire input image and/or a part of the input image on an area of a wallpaper setting window;
modifying the wallpaper displaying frame area according to a user's instruction; and
displaying the modified wallpaper displaying frame area on a wallpaper setting window;
wherein the modifying of the wallpaper displaying frame area includes:
setting a mode to display the input image on the wallpaper setting window, the mode selectively including an original size mode, a fixed ratio mode, and a user-defined mode; and
modifying the selected wallpaper displaying frame area in the set mode according to a user's instruction;
wherein the modifying of the wallpaper displaying frame area includes:
converting the width and height of the wallpaper displaying frame area into the actual width and height of the wallpaper displaying frame area to be displayed on the original input image by dividing the width and height of the wallpaper displaying frame area by a predetermined ratio;
storing the upper-left apex coordinates of the converted wallpaper displaying frame area and the converted width and height of the wallpaper displaying frame area as separate variables; and
matching one of the variables regarding the upper-left apex coordinates with origin coordinates of the wallpaper area and matching another of the variables regarding the converted width and height of the wallpaper displaying frame area with the width and height of the wallpaper area.

10. The method of claim 9, wherein the displaying of the converted wallpaper displaying frame area on the wallpaper area includes displaying the converted wallpaper displaying frame area on the wallpaper area on the basis of the results of the matching.

11. An apparatus for displaying wallpaper, comprising:
an application unit that displays an input image to be inputted as a background image for a wallpaper area and a wallpaper displaying frame area containing the entire input image and/or a part of the input image on a wallpaper setting window;
a modification unit that modifies the wallpaper displaying frame area specified by the application unit according to a user's instruction; and
a wallpaper displaying unit that displays the wallpaper displaying frame area modified by the modification unit on the wallpaper area;
wherein, when the wallpaper displaying frame area is larger than the background image, the modification unit changes a location of the wallpaper displaying frame area relative to the input image according to the user's instruction.

12. The apparatus of claim 11, further comprising:
a determination unit that compares the size of the input image with the size of the wallpaper area,
wherein the application unit displays on the wallpaper setting window a modified input image of the input image obtained by multiplying the input image size by a predetermined ratio according to the results of the comparison of the determination unit, and displays on the wallpaper setting window the modified wallpaper displaying frame area obtained by multiplying the size of the wallpaper by the predetermined ratio.

13. The apparatus of claim 12, wherein the predetermined ratio is determined by dividing the size of the wallpaper setting window by the size of the input image when the input image is larger than the wallpaper area, and by dividing the size of the wallpaper setting window by the size of the wallpaper area when the input image is smaller than the wallpaper area.

14. The apparatus of claim 11, further comprising:
a mode setting unit that sets a mode for displaying the input image on the wallpaper setting window,
wherein the modification unit modifies the wallpaper displaying frame area according to the user's input instruction in the mode set by the mode setting unit.

15. The apparatus of claim 14, wherein the mode selectively includes an original size mode, a fixed ratio mode and/or a user-defined mode.

16. An apparatus for displaying wallpaper, comprising:
an application unit that displays an input image to be inputted as a background image for a wallpaper area and a wallpaper displaying frame area containing the entire input image and/or a part of the input image on a wallpaper setting window;
a modification unit that modifies the wallpaper displaying frame area specified by the application unit according to a user's instruction; and
a wallpaper displaying unit that displays the wallpaper displaying frame area modified by the modification unit on the wallpaper area;
a mode setting unit that sets a mode for displaying the input image on the wallpaper setting window, the mode selectively including an original size mode, a fixed ratio mode and/or a user-defined mode,
wherein the modification unit modifies the wallpaper displaying frame area according to the user's input instruction in the mode set by the mode setting unit; and
wherein the modification unit changes the location of the wallpaper displaying frame area in the wallpaper setting window in the original size mode, changes the location and size of the wallpaper displaying frame area in the wallpaper setting window in the fixed ratio mode, and changes the location, size, and the ratio of the width to height of the wallpaper displaying frame area in the user-defined mode.

17. The apparatus of claim 16, wherein the modification unit is operated by a user clicking or dragging a mouse on the wallpaper displaying frame area.

18. An apparatus for displaying wallpaper, comprising:
an application unit that displays an input image to be inputted as a background image for a wallpaper area and a wallpaper displaying frame area containing the entire input image and/or a part of the input image on a wallpaper setting window;
a modification unit that modifies the wallpaper displaying frame area specified by the application unit according to a user's instruction; and
a wallpaper displaying unit that displays the wallpaper displaying frame area modified by the modification unit on the wallpaper area;
a mode setting unit that sets a mode for displaying the input image on the wallpaper setting window, the mode selectively including an original size mode, a fixed ratio mode and/or a user-defined mode,
wherein the modification unit modifies the wallpaper displaying frame area according to the user's input instruction in the mode set by the mode setting unit; and
wherein the modification unit includes:
a conversion unit that converts the width and height of a frame marked area into the width and height of a converted frame area to be displayed on the original input image by dividing the width and height of the frame marked area with a predetermined ratio;
a storage unit that stores the upper-left apex coordinates of the converted frame area and the converted width and height as separate variables; and
a matching unit that matches one of the variable regarding the upper-left apex coordinates with the origin coordinates of the wallpaper area and matches another of the variable regarding the converted width and height with the width and height of the wallpaper area,
wherein the wallpaper displaying unit displays the converted frame area on the wallpaper according to the results of the matching by the matching unit.

19. A method of displaying a wallpaper on a wallpaper area of a display, comprising:
displaying an image on a window;
displaying a frame area representing the wallpaper area over the image; and
modifying the frame area according to a user's instruction so that the user can decide a location, size and/or ratio of width to height of the image displayed on wallpaper area of the display;
wherein, when the wallpaper displaying frame area is larger than the background image, the modifying of the wallpaper displaying frame area comprises changing a location of the wallpaper displaying frame area relative to the input image according to the user's instruction.

20. The method of claim 19, wherein the modifying the frame area includes:
comparing the size of the image with the size of a wallpaper area; and
adjusting a size of the frame area by a value obtained by multiplying the size of the wallpaper area by a predetermined ratio.

21. The method of claim 20, wherein the predetermined ratio is determined by dividing a size of window by a size of the image when the image is larger than the wallpaper area, and by dividing the size of the window by the size of the wallpaper area when the image is smaller than the wallpaper area.

22. The method of claim 20, wherein the modifying of the frame area further includes:
setting a mode to display the image on the window; and
modifying the frame area in the set mode according to a user's instruction.

23. The method of claim 22, wherein the mode includes an original size mode, a fixed ratio mode and/or a user-defined mode.

24. A computer readable recording medium, which records a computer-readable program implementing the method of displaying wallpaper according to claim 19.

25. A method of displaying a wallpaper on a wallpaper area of a display, comprising:
displaying an image on a window;
displaying a frame area representing the wallpaper area over the image; and
modifying the frame area according to a user's instruction so that the user can decide a location, size and/or ratio of width to height of the image displayed on wallpaper area of the display;
wherein the modifying of the frame area further includes:
setting a mode to display the image on the window, the mode including an original size mode, a fixed ratio mode and/or a user-defined mode; and
modifying the frame area in the set mode according to a user's instruction;
wherein during the modifying of the frame area, when the original size mode is set, the location of the frame area in the window is changed, when the fixed ratio mode is set, the location and the size of the frame area is changed in the window, and when the user-defined mode is set, the location, size and ratio of width to height of the frame area is changed in the window.

* * * * *